US008315649B1

(12) United States Patent
McClendon et al.

(10) Patent No.: US 8,315,649 B1
(45) Date of Patent: Nov. 20, 2012

(54) PROVIDING A GEOGRAPHIC LOCATION OF A DEVICE WHILE MAINTAINING GEOGRAPHIC LOCATION ANONYMITY OF ACCESS POINTS

(75) Inventors: Brian McClendon, Portola Valley, CA (US); Tsuwei Chen, Cupertino, CA (US); Andrew Kirmse, Redwood City, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/429,276

(22) Filed: Mar. 23, 2012

(51) Int. Cl.
*H04W 24/00* (2009.01)

(52) U.S. Cl. .................. 455/456.1; 455/404.1; 455/411; 455/457; 455/435.1

(58) Field of Classification Search .............. 455/404.2, 455/411, 456.1, 457, 435.1
See application file for complete search history.

(56) References Cited

U.S. PATENT DOCUMENTS

| 8,185,131 | B2 * | 5/2012 | Wood ......................... 455/456.1 |
| 2006/0022048 | A1 | 2/2006 | Johnson | |
| 2011/0185434 | A1 | 7/2011 | Wetterstrom et al. | |
| 2012/0005023 | A1 * | 1/2012 | Graff ......................... 705/14.58 |
| 2012/0009950 | A1 * | 1/2012 | Islam et al. ................. 455/456.6 |

OTHER PUBLICATIONS

McCullagh, "Researchers probe Google's geolocation database", Privacy Inc.—CNET News, retrieved from <http://news.cnet.com/8301-31921_3-20084285-281/researchers-probe-googles-geolocation-database/>, Jul. 27, 2011.

* cited by examiner

*Primary Examiner* — Kwasi Karikari
(74) *Attorney, Agent, or Firm* — McDermott Will & Emery LLP

(57) ABSTRACT

Systems and methods for providing geographic location of device are provided. Method includes receiving query for location of device. Query includes indicia of one or more access points. Method includes determining whether query includes indicia of only single access point or multiple access points. Method includes, if query includes indicia of only single access point, facilitating providing low resolution version of location of device. Low resolution version of location of device is not determined based on indicia of access points. Method includes, if query includes indicia of multiple access points, determining whether distance between locations of two of multiple access points exceeds distance threshold, and if distance between locations exceeds distance threshold, facilitating providing low resolution version of location of device, or if the distance between locations does not exceed distance threshold, providing high resolution version of location of device determined based on the indicia of multiple access points.

20 Claims, 4 Drawing Sheets

PROVIDING A GEOGRAPHIC LOCATION OF A DEVICE WHILE MAINTAINING GEOGRAPHIC LOCATION ANONYMITY OF ACCESS POINTS

FIELD

The subject technology generally relates to network-based applications and, in particular, relates to providing a geographic location of a device while maintaining geographic location anonymity of access points.

BACKGROUND

Local network access points (e.g., WiFi network access points) that allow devices (e.g., mobile phones and laptop computers) to access a network are well-known and found in many different locations. Some local networks may be associated with a geographic location and may be used by a device to determine the geographic location of the device. In one implementation, a database stores an association of network identifiers, e.g., media access control (MAC) addresses, and geographic locations. The database may allow a device that is connected to a local network to quickly determine its geographic location based on the network identifier of a local network accessible to the device.

SUMMARY

The disclosed subject matter relates to a method for providing a geographic location of a device while maintaining geographic location anonymity of access points. The method includes receiving, from the device, a query for the geographic location of the device. The query includes indicia of one or more access points accessible to the device. The method also includes determining whether the query includes indicia of only a single access point or multiple access points. The method also includes, if the query includes indicia of only a single access point, facilitating providing for a low resolution version of the geographic location of the device. The low resolution version of the geographic location of the device is not determined based on the indicia of the single access point. The method also includes, if the query includes indicia of multiple access points, determining whether a distance between stored geographic locations of two of the multiple access points exceeds a distance threshold. The method also includes, if the distance between the stored geographic locations exceeds the distance threshold, facilitating providing for the low resolution version of the geographic location of the device. The low resolution version of the geographic location of the device is not determined based on the indicia of the multiple access points. The method also includes, if the distance between the stored geographic locations does not exceed the distance threshold, providing for a high resolution version of the geographic location of the device. The high resolution version of the geographic location of the device is determined based on the indicia of the multiple access points.

The disclosed subject matter further relates to a non-transitory computer-readable medium. The computer-readable medium includes instructions that, when executed by a computer, cause the computer to implement a method for providing for a geographic location of a device while maintaining geographic location anonymity of access points. The instructions include code for receiving, from the device, a query for the geographic location of the device. The query includes indicia of one or more access points and an Internet Protocol (IP) address. The instructions also include code for determining whether the query includes indicia of only a single access point or multiple access points. The instructions also include code for, if the query includes indicia of only a single access point, providing for a low resolution version of the geographic location of the device. The low resolution version of the geographic location of the device is determined based on one or more of the Internet Protocol (IP) address, a cellular signal, a reading from a magnetometer, or a reading from a camera. The instructions include code for, if the query includes indicia of multiple access points, determining whether a distance between stored geographic locations of two of the multiple access points exceeds a distance threshold. The instructions also include code for, if the distance between the stored geographic locations exceeds the distance threshold, providing for the low resolution version of the geographic location of the device. The low resolution version of the geographic location of the device is determined based on one or more of the Internet Protocol (IP) address, a cellular signal, a reading from a magnetometer, or a reading from a camera. The instructions also include code for, if the distance between the stored geographic locations does not exceed the distance threshold, providing for a high resolution version of the geographic location of the device. The high resolution version of the geographic location of the device is determined based on the indicia of the multiple access points.

The disclosed subject matter further relates to a system. The system includes one or more processors. The system also includes a memory. The memory includes instructions that, when executed by the one or more processors, cause the one or more processors to implement a method for providing a geographic location of a device while maintaining geographic location anonymity of access points. The instructions include code for receiving, from the device, a query for the geographic location of the device. The query includes one or more media access control (MAC) address corresponding to one or more access points accessible to the device. The instructions also include code for determining whether the query includes only a single media access control (MAC) address or multiple media access control (MAC) addresses. The instructions also include code for, if the query includes only a single media access control (MAC) address, facilitate providing for a low resolution version of the geographic location of the device. The low resolution version of the geographic location of the device is not determined based on the single media access control (MAC) address. The instructions also include code for, if the query includes multiple media access control (MAC) addresses, determining whether a distance between stored geographic locations corresponding to two of the media access control (MAC) addresses exceeds a distance threshold. The instructions also include code for, if the distance between the stored geographic locations exceeds the distance threshold, facilitating providing for the low resolution version of the geographic location of the device. The low resolution version of the geographic location of the device is not determined based on the multiple media access control (MAC) addresses. The instructions also include code for, if the distance between the stored geographic locations does not exceed the distance threshold, providing for a high resolution version of the geographic location of the device. The high resolution version of the geographic location of the device is determined based on at least one of the multiple media access control (MAC) addresses.

It is understood that other configurations of the subject technology will become readily apparent to those skilled in the art from the following detailed description, where various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

The features of the subject technology are set forth in the appended claims. However, for purpose of explanation, several aspects of the disclosed subject matter are set forth in the following figures.

DETAILED DESCRIPTION

Figure 1:
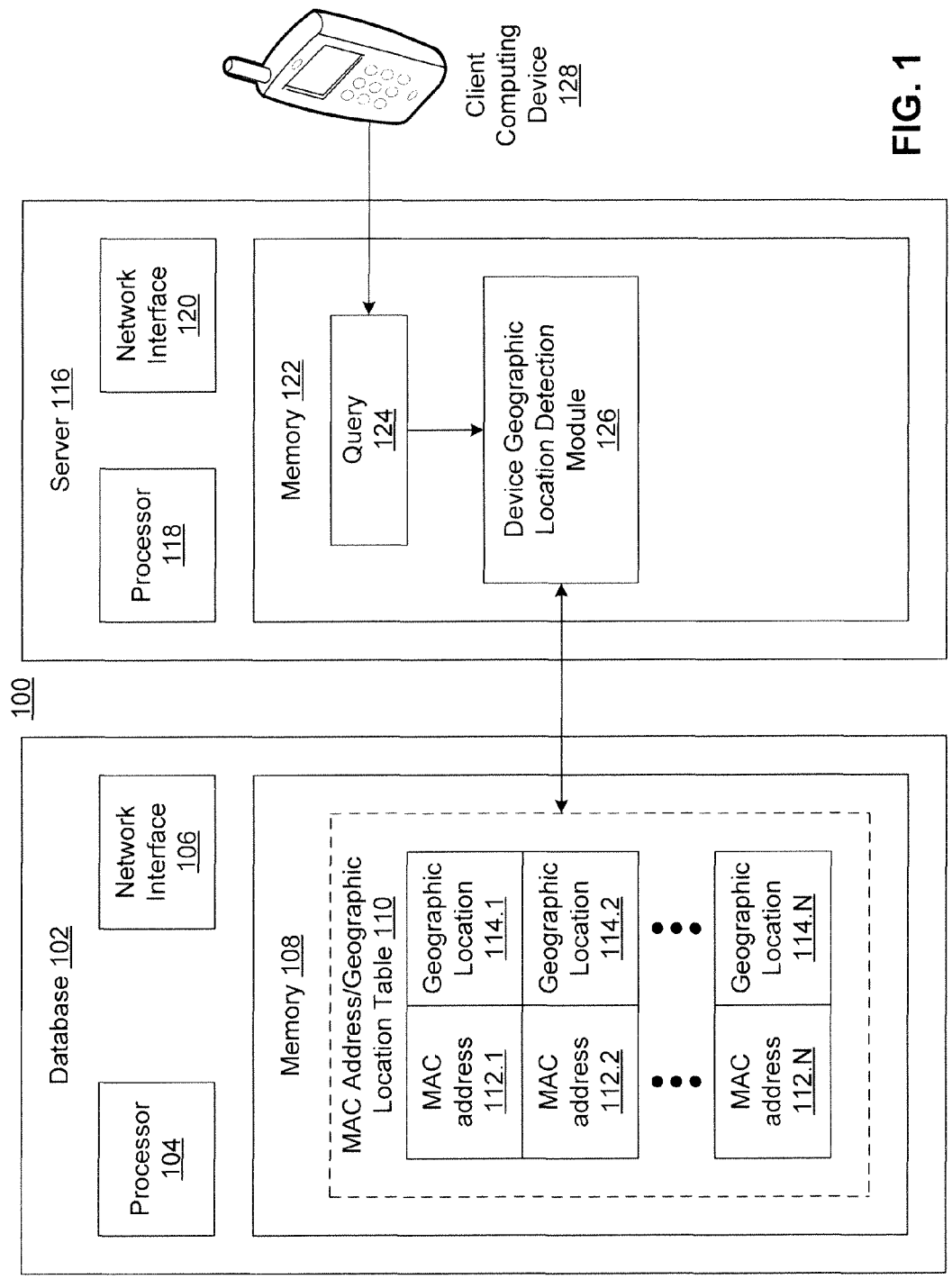
FIG. 1 illustrates an example of a computer system configured to provide a geographic location of a device while maintaining geographic location anonymity of access points.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced without these specific details. In some instances, well-known structures and components are shown in block diagram form in order to avoid obscuring the concepts of the subject technology.

As noted above, a database can store an association of network identifiers, e.g., MAC addresses, and geographic locations. The database may allow a device that is connected to a local network to quickly determine its geographic location based on the network identifier of a local network accessible to the device. One drawback of this database scheme is that, if a malicious user learns a media access control (MAC) address of a person, the malicious user may access the database to learn the person's geographic location. Also, owners of access points may not desire to share their geographic location information with others. As the foregoing illustrates, an approach that would allow a device to determine its geographic location based on nearby local network access points, while preventing malicious users from learning geographic locations associated with MAC addresses that they know, may be desirable.

The subject technology is related to approaches for providing a geographic location of a device while maintaining geographic location anonymity of access points. Access points may include local area network (LAN) access points, for example, wired LAN access points, wireless LAN access points, or WiFi access points. A server may receive, from the device, a query for the geographic location of the device. The query may include indicia, for example, MAC addresses, of one or more access points accessible to the device. The server may determine whether the query includes indicia of only a single access point or multiple access points. If the query includes indicia of only a single access point, the server may facilitating providing for a low resolution version of the geographic location of the device. The low resolution version of the geographic location of the device may not be determined based on the indicia of the single access point. For example, the low resolution version of the geographic location of the device may be determined by the server based on one or more of the IP address of the device, a reading from a magnetometer on the device, or a reading from a camera on the device. If the query includes indicia of multiple access points, the server may determine whether a distance between stored geographic locations of two of the multiple access points exceeds a distance threshold. If the distance between the stored geographic locations exceeds the distance threshold, the server may facilitate providing for the low resolution version of the geographic location of the device. The low resolution version of the geographic location of the device may not be determined based on the indicia of the multiple access points. For example, the low resolution version of the geographic location of the device may be determined by the server based on the IP address of the device or by the device based on a cellular receiver within the device. If the distance between the stored geographic locations does not exceed the distance threshold, the server may provide for a high resolution version of the geographic location of the device. The high resolution version of the geographic location of the device may be determined based on the indicia of the multiple access points. For example, the server may, via a database, look up a corresponding geographic location of one of the multiple access points and provide the corresponding geographic location as the high resolution version of the location of the device. The high resolution version of the geographic location of the device may be based on triangulation of signals from three or more access points, where the query includes indicia, e.g., MAC addresses, of the three or more access points. The database may include a table of MAC addresses of access points and corresponding geographic locations.

Advantageously, the subject technology provides techniques for a device to determine its geographic location based on nearby local network access points, while protecting location anonymity of the network access points. As a result, devices are able to detect their location using nearby local network access point information, while malicious users cannot learn a location of a network access point based only on the MAC address of the network access point, and the privacy of access point owners is protected.

FIG. 1 illustrates an example of a computer system 100 configured to provide a geographic location of a device (e.g., client computing device 128) while maintaining geographic location anonymity of access points.

As shown, the computer system 100 includes a database 102, a server 116 and a client computing device 128. The database 102, server 116, and client computing device 128 may be configured to communicate with one another via a network, e.g., the Internet or a cellular network. While only one database 102, server 116, and client computing device 128 are illustrated, the subject technology may be implemented with one or more databases 102, servers 116, and client computing devices 128. Alternatively, a single machine may implement the functions of the database 102, the server 116, or the client computing device 128. Furthermore, the server 116 may include a single-processor machine, a multi-processor machine, or multiple machines including multiple processors.

The database 102 may be configured to store information that other computing devices, e.g., the server 116, may access, e.g., via a network.

As shown, the database 102 includes a processor 104, a network interface 106, and a memory 108. The processor 104 is configured to access data or execute computer instructions that are stored in a computer-readable medium, for example, the memory 108. For example, the processor 104 may be a central processing unit (CPU). The network interface 106 is configured to allow the database 102 to transmit and receive data in the network. The network interface 106 may include one or more network interface cards (NICs). The memory 108 stores data and instructions. As illustrated, the memory 108 stores a MAC address/geographic location table 110.

The MAC address/geographic location table 110 stores one or more MAC addresses 112.1-*n*. Each MAC address 112.*k* may correspond to an access point for a local area network (LAN), e.g., a WiFi access point, a wired local area network access point, or a wireless local area network access point. One or more MAC address 112.*k* may have a corresponding geographic location 114.*k*. The MAC address/geographic location table may store a correspondence of a MAC address (e.g., MAC address 112.*k*) to a geographic location (e.g. geographic location 114.*k*). The MAC address/geographic location table 110 may store correspondences between MAC addresses 112 and geographic locations 114. However, an owner of an access point having a MAC address) may opt-out of having the memory 108 of the database 102 include the corresponding geographic location.

The server 116 may be configured to provide a geographic location of a device (e.g., client computing device 128) while maintaining geographic location anonymity of access points.

As shown, the server 116 includes a processor 118, a network interface 120, and a memory 122. The processor 118 is configured to access data execute computer instructions that are stored in a computer-readable medium, for example, the memory 122. For example, the processor 118 may be a central processing unit (CPU). The network interface 120 is configured to allow the server 116 to transmit and receive data in the network. The network interface 120 may include one or more network interface cards (NICs). The memory 122 stores data and instructions. As illustrated, the memory 122 stores a query 124 and a device geographic location detection module 126.

The query 124 may include a request for a geographic location of a device (e.g., client computing device 128). The query 124 may include an identifier of the device and identifiers of one or more access points (e.g., MAC addresses of one or more access points) accessible to the device. In one implementation, the query may also include an Internet Protocol (IP) address of the device.

The device geographic location detection module 126 may be configured to detect the geographic location of the device (e.g., the client computing device 128) based on the query 124. The device geographic location detection module 126 may be configured to receive the query 124. The device geographic location detection module 126 may also be configured to determine whether the query includes an identifier (e.g., a MAC address) of only a single access point or of multiple access points. If the query includes an identifier of only a single access point, the device geographic location detection module 126 may provide for only a low resolution version of the geographic location of the device. The low resolution version of the geographic location of the device may not be based on the identifier (e.g., the MAC address) of the single access point. For example, the low resolution version of the geographic location of the device may be based on the IP address of the device. If the query includes identifiers of multiple access points, the device geographic location detection module 126 may be configured to determine whether a distance between stored geographic locations of two of the access points (e.g., stored in the MAC address/geographic location table 110 of the database 102) exceeds a distance threshold (e.g., 1.5 km). If the distance between the stored geographic locations exceeds the distance threshold, the device geographic location detection module 126 may provide for only a low resolution version of the geographic location of the device. The low resolution version of the geographic location of the device may not be based on the identifiers (e.g., the MAC addresses) of the access points. For example, the low resolution version of the geographic location of the device may be based on the IP address of the device. If the distance between the stored geographic locations does not exceed the distance threshold, the device geographic location detection module 126 may provide for a high resolution version of the geographic location of the device. The high resolution version of the geographic location of the device may be based on an identifier (e.g., a MAC address) of at least one of the multiple access points. For example, the high resolution version of the geographic location may correspond to a geographic location 114 corresponding to a MAC address 112 in the MAC address/geographic location table 110 of the database 102.

The client computing device 128 may be any computing device capable of interacting with the server 116 or of connecting to one or more access points. For example, the client computing device 128 may include a mapping application or a geographic check-in application that may request a geographic location of the client computing device 128. The client computing device 128 may be a laptop computer, a desktop computer, a mobile phone, a personal digital assistant (PDA), a tablet computer, a netbook, a television with one or more processors embedded therein or coupled thereto, a physical machine, or a virtual machine, for example. Other devices could also implement the functionalities of the client computing device 128. The client computing device 128 may include one or more of a keyboard, a mouse, a touch screen, and a display to allow a user to interact with the client computing device 128. Furthermore, while only one client computing device 128 is illustrated here, persons skilled in the art will recognize that the techniques disclosed herein may be implemented with one or more client computing devices 128.

Figure 2:
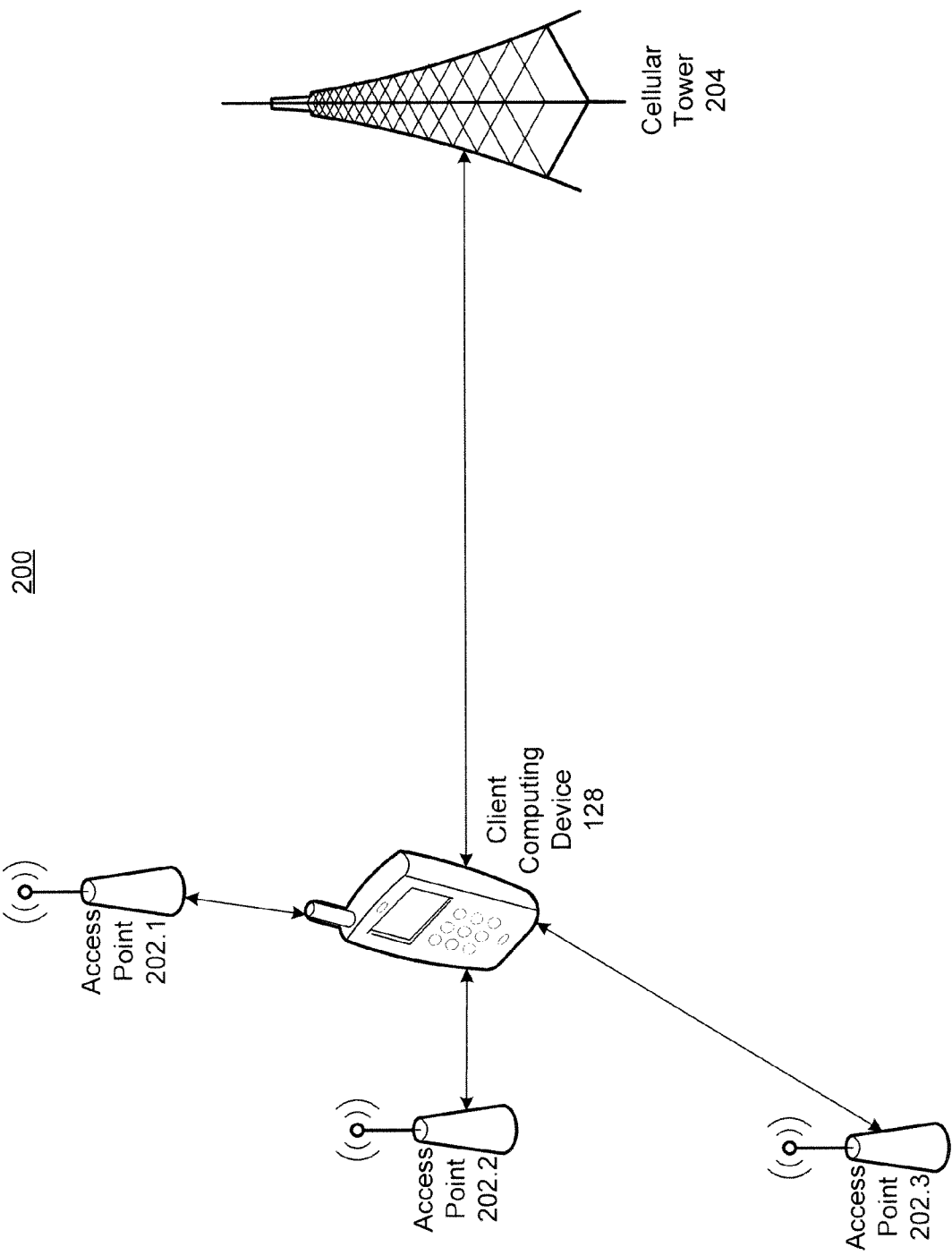
FIG. 2 illustrates an example of a computer system in which a device may be connected to multiple information sources.

FIG. 2 illustrates an example of a computer system 200 in which a device (e.g., client computing device 128) may be connected to multiple information sources.

As shown, the computer system 200 includes the client computing device 128, one or more access points 202.1-3, and a cellular tower 204. While three access points 202.1-3 and one cellular tower 204 are illustrated here, the subject technology may be implemented with none, one, or more than one of the access point 202 or the cellular tower 204.

The access points 202.1-3 may be associated with a wireless local area network (LAN) a wired local area network, or a WiFi network. One or more access points 202.1-3 may be accessible to the client computing device 128 simultaneously. For example, a user may connect the client computing device 128 (e.g., a laptop computer) via an Ethernet cable to access point 202.1, which may represent, for example, a wired local area network in an office. While connected to the wired local area network in the office, the client computing device 128 may detect, via a wireless radio associated with the network interface 120, an unsecured WiFi network of a coffee shop next door to the office that is accessible to the client computing device 128. The unsecured network of the coffee shop may, for example, correspond to access point 202.2. The wireless radio of the client computing device 128 may also detect a secured WiFi network of a home across the street from the office that is accessible to the client computing device 128. The secured WiFi network of the home may correspond, for example, to access point 202.3. It should be noted that, while the client computing device 128 may not be able to connect to the secured WiFi network of the home, the client computing device 128 may still detect that the client computing device 128 is located geographically proximate to the access point of the secured WiFi network and, therefore, the client computing device 128 may transmit (e.g., via an access point different from access point 202.3) this information to the server 116 for use in determining the geographic location of the client computing device 128. However, the owner of the secured WiFi network access point in the home may opt-out of having the corresponding geographic location stored in the database 102 for use by devices (e.g., client computing device 128) in determining their geographic locations. Furthermore, while three access points 202.1-3 are illustrated here, the client computing device 128 may be able to detect no access points, one access point, or any other number of access points (e.g., multiple access points).

The client computing device 128 may also be connected to a cellular tower 204. The cellular tower 204 may store, among other things, an indication of its geographic location. The cellular tower 204 may transmit its geographic location to the client computing device 128 and the client computing device 128 may user the location of the cellular tower 204 to compute a low resolution version of its own location. For example, the client computing device 128 may determine its location within a certain radius (e.g., within a 20 km radius) based on the location of the cellular tower 204.

Figure 3:
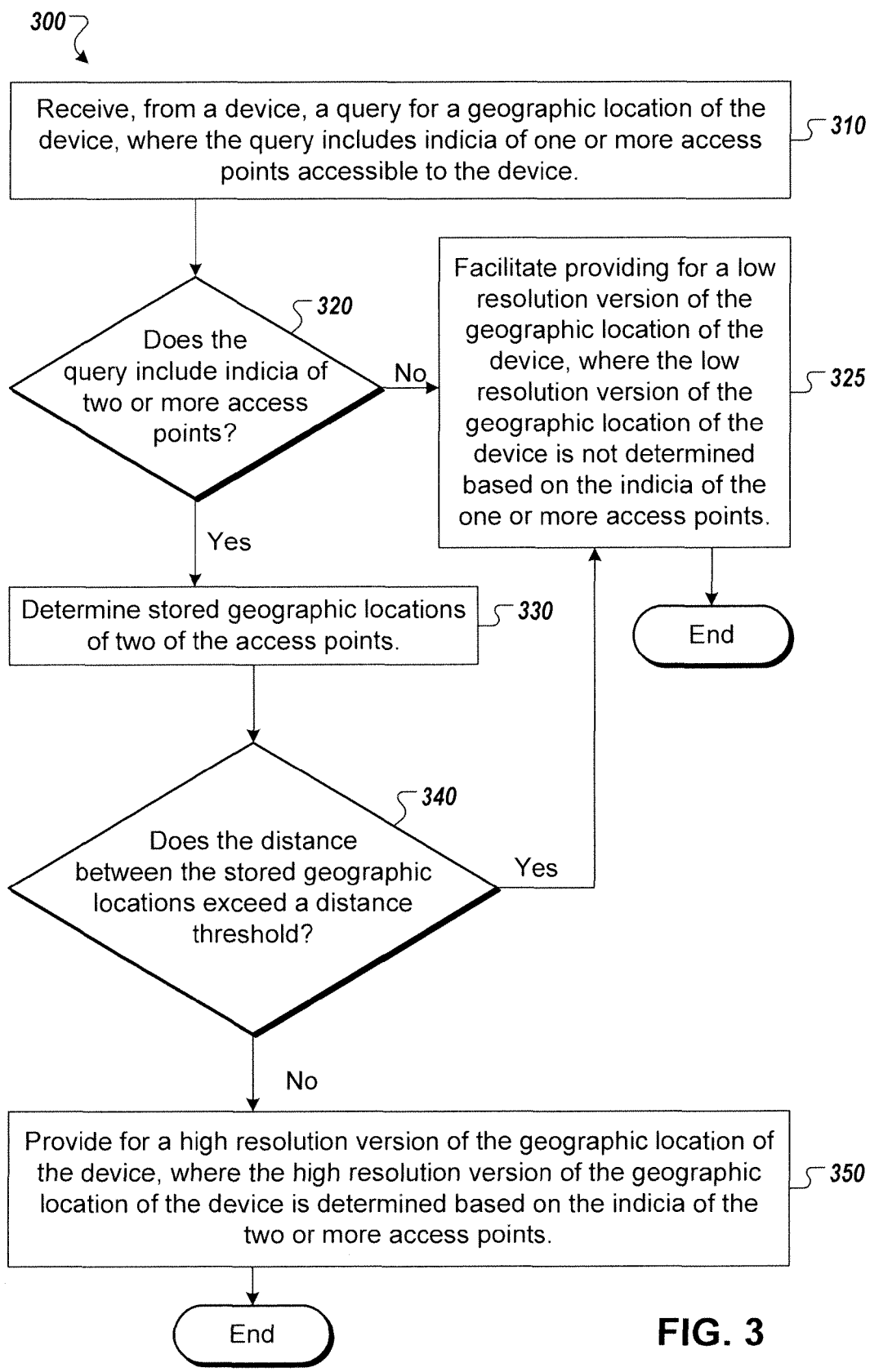
FIG. 3 illustrates an example process by which a geographic location of a device may be provided while maintaining geographic location anonymity of access points.

FIG. 3 illustrates an example process 300 by which a geographic location of a device may be provided while maintaining geographic location anonymity of access points.

The process 300 begins at step 310, where a server (e.g., server 116) receives, from a device (e.g., client computing device 128), a query for a geographic location of the device. A query for a geographic location of a device may be entered, for example, if a user of the device wishes to view a map of his/her current location or if the user of the device wishes to enter a geographic check-in (e.g., to a social networking service) at his/her current location. The query may include indicia of one or more access points (e.g., access points 202.1-3). The one or more access points may be accessible or visible to the device. The one or more access points may include one or more of a wireless local area network access point, a wired local area network access point, or a WiFi access point. The indicia of an access point may include the MAC address of the access point. In one example, the query may also include an IP address, e.g., the IP address of the device.

The query may be transmitted from the device to the server via a network, e.g., the Internet or a cellular network. However, the device may not be connected to the network via one of the access points. For example, a device may enter a query for its geographic location, where the query includes three WiFi access points (e.g., access points 202.1-3), via a cellular network. The device may access the cellular network via a Global System for Mobile Communications (GSM) cellular tower (e.g., cellular tower 204), where the GSM cellular tower is separate and distinct from the WiFi access points. The device may not connect to any of the WiFi access points, for example, if the WiFi access points include security features (e.g., a password that is not known to the user of the device) that prevent the device from connecting to the access points or the user has not configured the device to connect to the WiFi access points.

In step 320, the server determines whether the query includes indicia of two or more access points. If the query includes indicia of two or more access points, the process 300 continues to step 330. If the query includes indicia of only a single access point, the process 300 continues to step 325.

In step 325, the server facilitates providing for a low resolution version of the geographic location of the device. The low resolution version of the geographic location of the device may not be determined based on the indicia of the one or more access points. For example, the server may indicate the location of the device based on the IP address of the device. Alternatively, the server may facilitate determining the location of the device based on a cellular signal accessible to the device, a reading from a magnetometer on the device, or a reading from the camera on the device. After step 325, the process 300 ends.

It should be noted that, if the query includes indicia (e.g., a MAC address) of only a single access point (as in the no branch from step 320), the query may be associated with an attempt to determine a geographic location of an access point, rather than a geographic location of a device. As a result, only the low resolution version of the location, not determined based on the indicia of the access point may be provided to maintain the privacy of the owner of the access point.

In step 330, if the query includes indicia of two or more access points, the server determines stored geographic locations of two of the access points. The stored geographic locations may be stored in a database. For example, the database may include a table of MAC addresses and corresponding geographic locations. The table may be implemented as a hash table. A stored geographic location may be represented, for example, as a latitude/longitude or as a street address.

In step 340, the server determines whether the distance between the stored geographic locations of the two access points exceeds a distance threshold (e.g., 1 km). The distance threshold may be based on the signal range of a wireless signal, e.g., a wireless local area network signal or a WiFi signal. If the distance between the stored geographic locations of the two access points exceeds the distance threshold, the process 300 continues to step 325. If the distance between the stored geographic locations of the two access points does not exceed the distance threshold, the process 300 continues to step 350.

It should also be noted that, if the query includes indicia of two access points that are further than the threshold distance (e.g., 1 km) from one another (as in the yes branch of step 340), the query may involve a user attempting to determine a geographic location of one of the access points in the query, rather than a location of a device proximate to the two access points. As a result, only the low resolution version of the location, not determined based on the indicia of the access points may be provided to maintain the privacy of the owners of the access points.

In step 350, if the distance between the stored geographic locations of the two access points does not exceed the distance threshold, the server provides for a high resolution version of the geographic location of the device. The high resolution version of the geographic location of the device is determined based on the indicia of the two or more access points. After step 350, the process 300 ends.

It should be noted that, if the query includes indicia of two access points that are closer than the distance threshold (e.g., 1 km) to one another (as in the no branch of step 340), then the device is likely within the accessible or visible range of the two access points, as it may be difficult for a user or a machine two determine indicia (e.g. MAC addresses) of two access points that are proximate to one another without visiting a geographic location corresponding to the two access points, i.e., the geographic location from which the two access points are accessible or visible.

Figure 4:
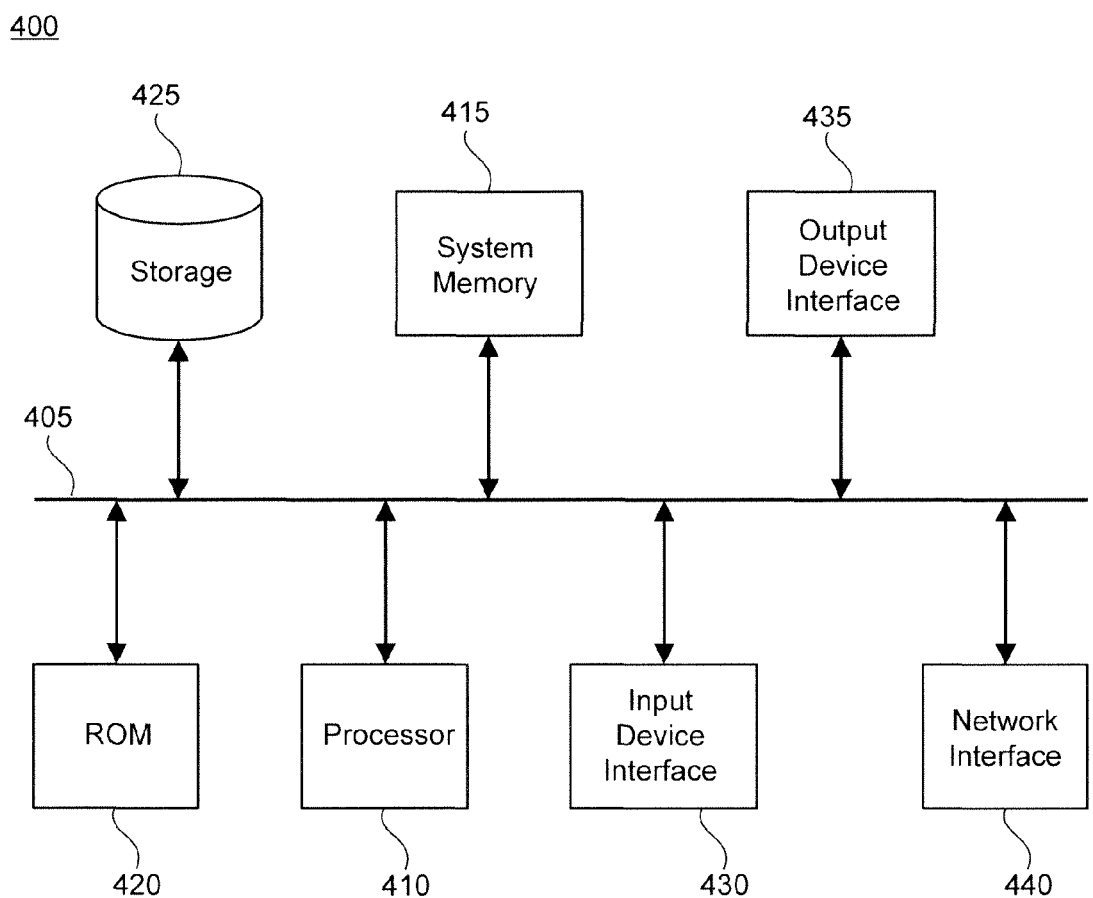
FIG. 4 conceptually illustrates an electronic system with which some implementations of the subject technology are implemented.

FIG. 4 conceptually illustrates an electronic system 400 with which some implementations of the subject technology are implemented. For example, one or more of the database 102, the server 116, or the client computing device 128 may be implemented using the arrangement of the electronic system 400. The electronic system 400 can be a computer (e.g., a mobile phone, PDA), or any other sort of electronic device. Such an electronic system includes various types of computer readable media and interfaces for various other types of computer readable media. Electronic system 400 includes a bus 405, processing unit(s) 410, a system memory 415, a read-only memory 420, a permanent storage device 425, an input device interface 430, an output device interface 435, and a network interface 440.

The bus 405 collectively represents all system, peripheral, and chipset buses that communicatively connect the numerous internal devices of the electronic system 400. For instance, the bus 405 communicatively connects the processing unit(s) 410 with the read-only memory 420, the system memory 415, and the permanent storage device 425.

From these various memory units, the processing unit(s) 410 retrieves instructions to execute and data to process in order to execute the processes of the subject technology. The processing unit(s) can be a single processor or a multi-core processor in different implementations.

The read-only-memory (ROM) 420 stores static data and instructions that are needed by the processing unit(s) 410 and other modules of the electronic system. The permanent storage device 425, on the other hand, is a read-and-write memory device. This device is a non-volatile memory unit that stores instructions and data even when the electronic system 400 is off. Some implementations of the subject technology use a mass-storage device (for example a magnetic or optical disk and its corresponding disk drive) as the permanent storage device 425.

Other implementations use a removable storage device (for example a floppy disk, flash drive, and its corresponding disk drive) as the permanent storage device 425. Like the permanent storage device 425, the system memory 415 is a read-and-write memory device. However, unlike storage device 425, the system memory 415 is a volatile read-and-write memory, such a random access memory. The system memory 415 stores some of the instructions and data that the processor needs at runtime. In some implementations, the processes of the subject technology are stored in the system memory 415, the permanent storage device 425, or the read-only memory 420. For example, the various memory units include instructions for providing a geographic location of a device while maintaining geographic location anonymity of access points in accordance with some implementations. From these various memory units, the processing unit(s) 410 retrieves instructions to execute and data to process in order to execute the processes of some implementations.

The bus 405 also connects to the input and output device interfaces 430 and 435. The input device interface 430 enables the user to communicate information and select commands to the electronic system. Input devices used with input device interface 430 include, for example, alphanumeric keyboards and pointing devices (also called "cursor control devices"). Output device interfaces 435 enables, for example, the display of images generated by the electronic system 400.

Output devices used with output device interface 435 include, for example, printers and display devices, for example cathode ray tubes (CRT) or liquid crystal displays (LCD). Some implementations include devices for example a touchscreen that functions as both input and output devices.

Finally, as shown in FIG. 4, bus 405 also couples electronic system 400 to a network (not shown) through a network interface 440. In this manner, the electronic system 400 can be a part of a network of computers (for example a local area network ("LAN"), a wide area network ("WAN"), or an Intranet, or a network of networks, for example the Internet. Any or all components of electronic system 400 can be used in conjunction with the subject technology.

The above-described features and applications can be implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage or flash storage, for example, a solid-state drive, which can be read into memory for processing by a processor. Also, in some implementations, multiple software technologies can be implemented as sub-parts of a larger program while remaining distinct software technologies. In some implementations, multiple software technologies can also be implemented as separate programs. Finally, any combination of separate programs that together implement a software technology described here is within the scope of the subject technology. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, for example microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, for example is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, for example application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some aspects of the disclosed subject matter, a server transmits data (e.g., an HTML page) to a client device (e.g., for purposes of displaying data to and receiving user input from a user interacting with the client device). Data generated at the client device (e.g., a result of the user interaction) can be received from the client device at the server.

It is understood that any specific order or hierarchy of steps in the processes disclosed is an illustration of example approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components illustrated above should not be understood as requiring such separation, and it should be understood that the described program components and systems can generally be integrated together in a single software product or packaged into multiple software products.

Various modifications to these aspects will be readily apparent, and the generic principles defined herein may be applied to other aspects. Thus, the claims are not intended to be limited to the aspects shown herein, but is to be accorded the full scope consistent with the language claims, where reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject technology.

A phrase, for example, an "aspect" does not imply that the aspect is essential to the subject technology or that the aspect applies to all configurations of the subject technology. A disclosure relating to an aspect may apply to all configurations, or one or more configurations. A phrase, for example, an aspect may refer to one or more aspects and vice versa. A phrase, for example, a "configuration" does not imply that such configuration is essential to the subject technology or that such configuration applies to all configurations of the subject technology. A disclosure relating to a configuration may apply to all configurations, or one or more configurations. A phrase, for example, a configuration may refer to one or more configurations and vice versa.

What is claimed is:

1. A computer-implemented method for providing a geographic location of a device while maintaining geographic location anonymity of access points, the method comprising:
    receiving, from the device, a query for the geographic location of the device, wherein the query comprises indicia of one or more access points accessible to the device;

determining whether the query comprises indicia of only a single access point or multiple access points;

if the query comprises indicia of only a single access point, providing for a low resolution version of the geographic location of the device, wherein the low resolution version of the geographic location of the device is not determined based on the indicia of the single access point; and if the query comprises indicia of multiple access points:
   determining whether a distance between stored geographic locations of two of the multiple access points exceeds a distance threshold, and
   if the distance between the stored geographic locations exceeds the distance threshold, facilitating providing for the low resolution version of the geographic location of the device, wherein the low resolution version of the geographic location of the device is not determined based on the indicia of the multiple access points, and
   if the distance between the stored geographic locations does not exceed the distance threshold, providing for a high resolution version of the geographic location of the device, wherein the high resolution version of the geographic location of the device is determined based on the indicia of the multiple access points.

2. The method of claim 1, wherein the low resolution version of the geographic location of the device is based on a cellular signal accessible to the device.

3. The method of claim 1, wherein the low resolution version of the geographic location of the device is based on an Internet Protocol (IP) address of the device.

4. The method of claim 1, wherein the high resolution version of the geographic location of the device is determined based on a geographic location corresponding to one of the multiple access points.

5. The method of claim 1, wherein the high resolution version of the geographic location of the device is based on triangulation of signals from three or more access points, and wherein the query comprises indicia of the three or more access points.

6. The method of claim 1, wherein the one or more access points accessible to the device comprise one or more of: a wireless local area network access point or a wired local area network access point.

7. The method of claim 6, wherein the wireless local area network access point comprises a WiFi access point.

8. The method of claim 1, wherein the indicia of the one or more access points comprise at least one media access control (MAC) address of at least one of the one or more access points.

9. The method of claim 1, wherein the stored geographic locations are stored in a database.

10. A computer-readable medium for providing a geographic location of a device while maintaining geographic location anonymity of access points, the computer-readable medium comprising instructions that, when executed by a computer, cause the computer to:
   receive, from the device, a query for the geographic location of the device, wherein the query comprises indicia of one or more access points and an Internet Protocol (IP) address;
   determine whether the query comprises indicia of only a single access point or multiple access points; and
   if the query comprises indicia of only a single access point, provide for a low resolution version of the geographic location of the device, wherein the low resolution version of the geographic location of the device is determined based on one or more of the Internet Protocol (IP) address, a cellular signal, a reading from a magnetometer, or a reading from a camera; and
   if the query comprises indicia of multiple access points:
      determine whether a distance between stored geographic locations of two of the multiple access points exceeds a distance threshold, and
      if the distance between the stored geographic locations exceeds the distance threshold, provide for the low resolution version of the geographic location of the device, wherein the low resolution version of the geographic location of the device is determined based on one or more of the Internet Protocol (IP) address, the cellular signal, the reading from the magnetometer, or the reading from the camera, and
      if the distance between the stored geographic locations does not exceed the distance threshold, provide for a high resolution version of the geographic location of the device, wherein the high resolution version of the geographic location of the device is determined based on the indicia of the multiple access points.

11. The computer-readable medium of claim 10, wherein the one or more access points are accessible to the device.

12. The computer-readable medium of claim 10, wherein the Internet Protocol (IP) address comprises an Internet Protocol (IP) address of the device.

13. The computer-readable medium of claim 10, wherein the indicia of the one or more access points comprise at least one media access control (MAC) address of at least one of the one or more access points.

14. The computer-readable medium of claim 10, wherein the high resolution version of the geographic location of the device is based on triangulation of signals from three or more access points, and wherein the query comprises indicia of the three or more access points.

15. The computer-readable medium of claim 10, wherein at least one of the one or more access points comprises a WiFi access point.

16. The computer-readable medium of claim 10, wherein the stored geographic locations are stored in a database.

17. A system for providing a geographic location of a device while maintaining geographic location anonymity of access points, the system comprising:
   one or more processors; and
   a memory comprising instructions that, when executed by the one or more processors, cause the one or more processors to:
      receive, from the device, a query for the geographic location of the device, wherein the query comprises one or more media access control (MAC) address corresponding to one or more access points accessible to the device,
      determine whether the query comprises only a single media access control (MAC) address or multiple media access control (MAC) addresses, and
      if the query comprises only a single media access control (MAC) address, facilitate providing for a low resolution version of the geographic location of the device, wherein the low resolution version of the geographic location of the device is not determined based on the single media access control (MAC) address, and
      if the query comprises multiple media access control (MAC) addresses:
         determine whether a distance between stored geographic locations corresponding to two of the media access control (MAC) addresses exceeds a distance threshold, and if the distance between the stored geographic locations exceeds the distance threshold, facilitate providing for the low resolution version of the geographic location of the device, wherein the low resolution version of the geographic location of the device is not determined based on the multiple media access control (MAC) addresses, or if the distance between the stored geographic locations does not exceed the distance threshold, provide for a high resolution version of the geographic location of the device, wherein the high resolution version of the geographic location of the device is determined based on at least one of the multiple media access control (MAC) addresses.

18. The system of claim 17, wherein the low resolution version of the geographic location of the device is based on a cellular signal accessible to the device.

19. The system of claim 17, wherein the low resolution version of the geographic location of the device is based on an Internet Protocol (IP) address of the device.

20. The system of claim 17, wherein the high resolution version of the geographic location of the device is determined based on a geographic location corresponding to the at least one of the multiple media access control (MAC) addresses.

* * * * *